United States Patent [19]

Watanabe et al.

[11] Patent Number: 5,619,300
[45] Date of Patent: Apr. 8, 1997

[54] AUTOFOCUS ADJUSTMENT DEVICE AND METHOD

[75] Inventors: Toshimi Watanabe, Kanagawa-ken; Seiichi Yasukawa, Chiba-ken, both of Japan

[73] Assignee: Nikon Corporation, Tokyo, Japan

[21] Appl. No.: 514,728

[22] Filed: Aug. 14, 1995

[30] Foreign Application Priority Data

Sep. 7, 1994 [JP] Japan .................................. 6-214079

[51] Int. Cl.$^6$ ...................................................... G03B 13/36
[52] U.S. Cl. ................................................................. 396/95
[58] Field of Search ........................................ 354/402, 406, 354/407, 408, 400; 250/201.2, 201.7, 201.8

[56] References Cited

U.S. PATENT DOCUMENTS

5,061,951 10/1991 Higashihara et al. .............. 354/402 X
5,061,953 10/1991 Higashihara et al. .............. 354/402 X
5,189,459 2/1993 Watanabe et al. .................. 354/402 X
5,239,332 8/1993 Muramatsu et al. ..................... 354/402

*Primary Examiner*—W. B. Perkey
*Attorney, Agent, or Firm*—Oliff & Berridge

[57] ABSTRACT

An autofocus adjustment device includes a focus detection assembly that repeatedly detects the focus coordination state of the photographic lens assembly. A memory stores the results of the focus detection assembly. The device includes a movement direction reversal determination assembly that determines reversal of the movement direction of a subject based on the focus coordination state recorded in the memory. An exposure assembly controls the photographic operation. A prohibition assembly prohibits photographic operation until the focus detection operations are executed for a specified number of times when the movement direction reversal determination assembly determines that the movement direction of the photographic subject has reversed.

34 Claims, 11 Drawing Sheets

AUTOFOCUS ADJUSTMENT DEVICE AND METHOD

BACKGROUND OF THE INVENTION

1. Field of the Invention

The present invention relates to an autofocus adjustment device and method for a camera, a video camera, and the like capable of executing proper predicted driving when the direction of movement of the photographic subject reverses.

2. Discussion of Related Art

In the past, a camera having a focus detection device tracks a moving photographic subject by predicted driving of the photographic lens assembly when the photographic subject is moving and prohibits driving of the photographic lens assembly if predicted driving is not appropriate (Japanese Unexamined Patent Publication Hei 1-285908).

Figure 1:
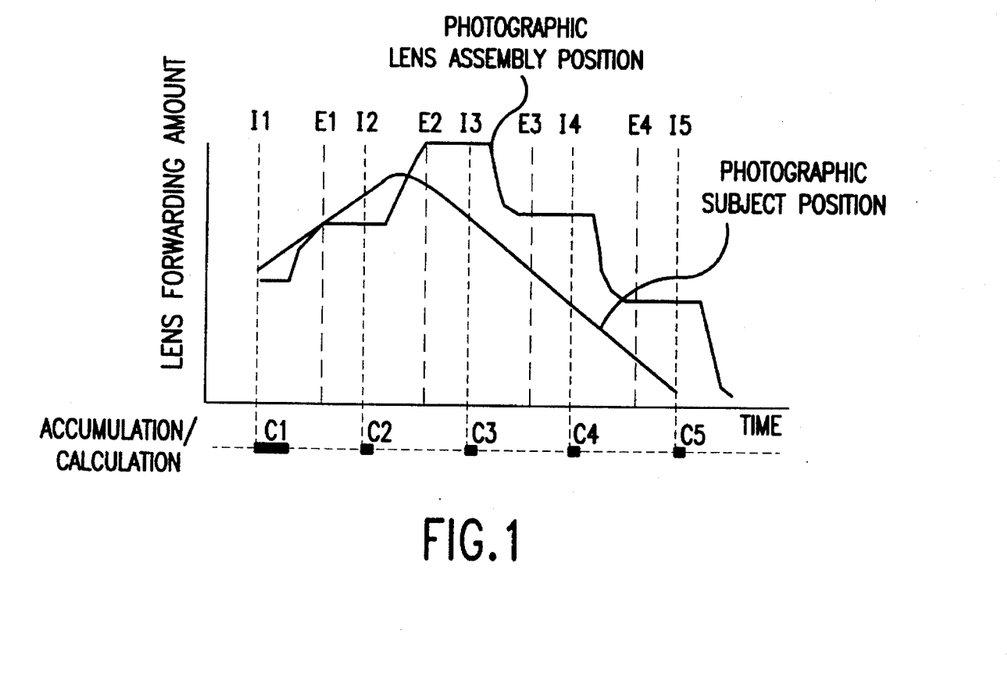
FIG. 1 depicts the relationship between lens driving and exposure in a conventional camera.

A conventional camera capable of performing predicted driving of the photographic lens assembly can continuously shoot a photographic subject passing in front of the photographer. In this case, the locus of the movement of the photographic lens assembly operates in a manner illustrated by FIG. 1. The dotted line in FIG. 1 denotes the starting time of electric charge accumulation (I1, I2, . . . , I5), the broken line denotes the time of exposure (E1, E2, . . . , E4), and the blocks in the accumulation/calculation line represent the period of time during which the electric charge accumulation and the focus detection calculation are performed (C1, C2, . . . , C5).

The conventional camera that is capable of performing projected driving prohibits projected driving after a moving subject reverses the direction of its movement. Moreover, because projected driving is not executed unless a specified number of focus detections is performed, much time elapses until projected driving occurs during the time of continuous photography. Therefore, this type of camera often suffers from blurred pictures and a lack of an intersection of the photographic lens assembly position and the photographic subject position, that is, an inability to focus the photographic lens assembly at the time of exposure for some time after reversal of the direction of the movement of the photographic subject.

SUMMARY OF THE INVENTION

An object of the present invention is to overcome the above problems by providing an autofocus adjustment device and method capable of executing proper predicted driving all the time even when the direction of movement of the photographic subject is reversed.

This and other objects of the invention are achieved by providing an autofocus adjustment device for a camera for focus adjustment of a photographic subject that changes movement directions. The autofocus adjustment device includes a focus detection assembly that repeatedly performs focus detection operations on a photographic subject and focus adjustment operations on a photographic lens assembly of the camera. The focus detection assembly repeatedly performs focus detection operations by repeatedly detecting a focus coordination state of the photographic lens assembly. A movement direction determination assembly is coupled to the focus detection assembly and determines when a movement direction of the photographic subject reverses or changes. This determination is based on results of the focus detection operations performed by the focus detection assembly. An exposure control assembly is also coupled to the focus detection assembly and controls the photographic operation of the camera. A photographic operation prohibiting control assembly is coupled to the exposure control assembly. The prohibiting control assembly prohibits photographic operation of the camera until a specified number of focus detection operations is executed after the movement direction of the photographic subject has changed. This permits accurate predicted driving of the photographic lens assembly. Additionally, this eliminates most blurry pictures during continuous photography even if the movement direction of the photographic subject changes.

In the present invention, shutter release is prohibited until focus detection is performed for a specified number of times when reversal of the movement direction of photographic subject is detected by the movement direction determination assembly. This permits the reduction in the number of blurred pictures even when the movement direction of the photographic subject reverses during continuous photography.

A memory is coupled to the focus detection assembly and stores the focus coordination state of the photographic lens assembly that is detected by the focus detection assembly. The movement direction determination assembly determines that the movement direction of the photographic subject has changed based upon the stored focus coordination state. The movement direction determination assembly also determines the movement direction of the photographic subject. This is accomplished by comparing a previously determined movement direction stored in the memory with a presently determined movement direction.

The movement direction determination assembly also determines a movement amount of the photographic subject. The movement direction determination assembly determines that the movement direction has not changed when a ratio of determined movement amounts is outside of a specified range. This determination may occur even if the movement direction has reversed and the ratio of determined movement amounts is outside of the specified range.

Furthermore, the present invention is capable of eliminating most blurred pictures because it keeps driving the photographic lens assembly toward the photographic subject during the specified number of focus detection operations even when the movement direction of the photographic subject changes when pictures are being taken continuously. This produces faster focusing speed and continuous photography speeds.

In accordance with another aspect of the invention, there is provided a method of autofocus adjustment for a photographic subject. The method includes repeatedly performing focus detection operations on the photographic subject. Based on the focus detection operations, it is determined whether the photographic subject is moving and whether the movement direction of the photographic subject has changed. The photographic operation of the camera is controlled based on the focus detection operations. The photographic operation is prevented when the movement direction of the photographic subject has changed and a specified number of focus detection operations has not been executed.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

The autofocus adjustment device of the present invention includes a focus detection assembly that repeatedly detects the focus coordination state of a photographic lens assembly. A memory unit stores the results of the focus detection assembly. A movement direction determination assembly determines whether the movement direction of the photographic subject has reversed based on the focus coordination state recorded in the memory. An exposure assembly controls the photographic operation. A prohibition assembly prohibits photographic operation until the focus detection operations are executed for a specified number of times when the movement direction determination assembly determines that the movement direction of the photographic subject has reversed.

Figure 4:
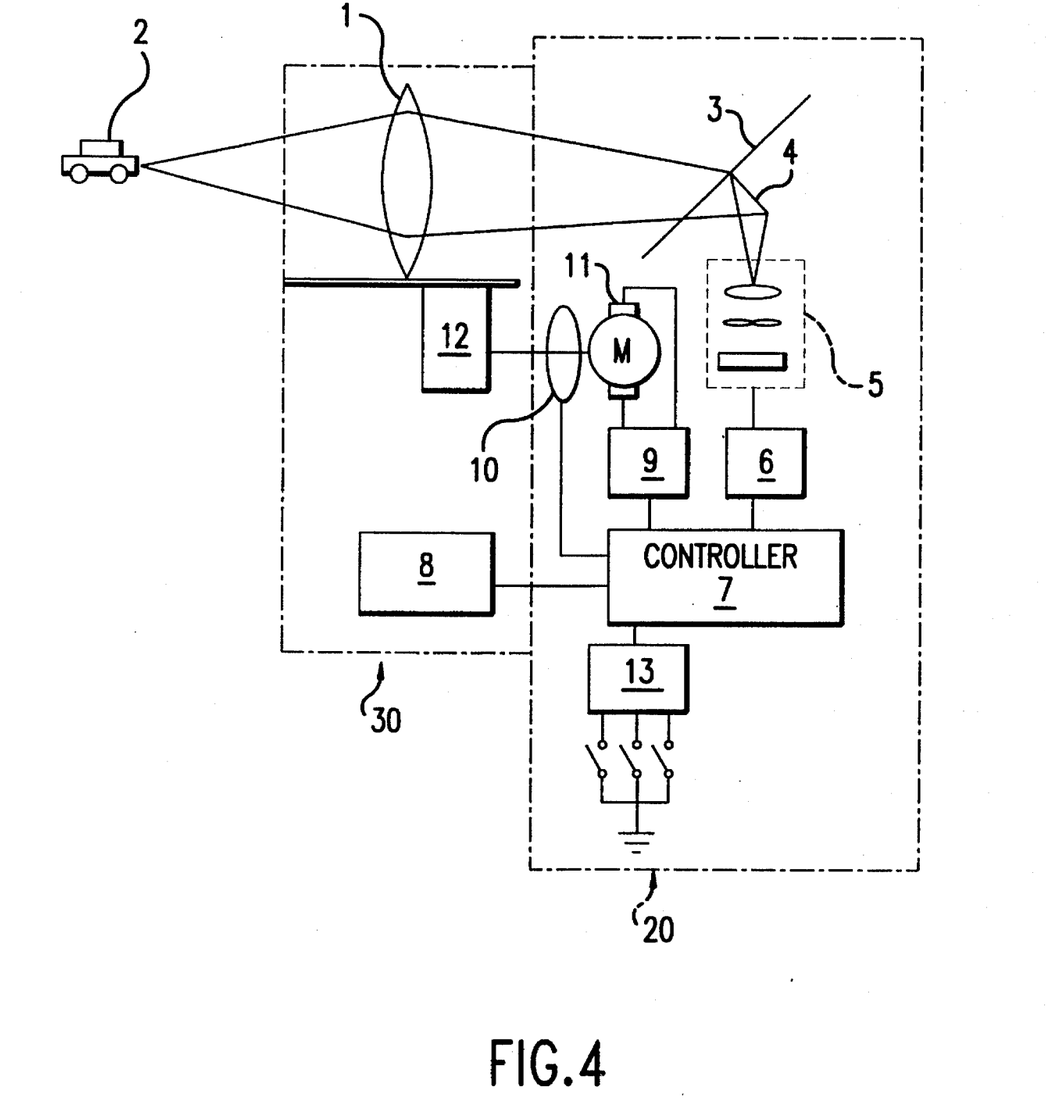
FIG. 4 is a structural drawing of a camera using the present invention.

Referring to FIG. 4, the focus detection assembly includes an AF module 5, a sensor driving circuit 6, a controller 7, a motor control circuit 9, an encoder 10, and a motor 11. The controller 7 includes the memory unit. The controller 7 also includes the movement direction determination assembly. The movement determination assembly performs steps S306–311 in FIG. 10 discussed below. The controller 7 also includes the assembly that performs a release interruption subroutine, discussed below in connection with FIG. 14. The controller 7 includes the assembly that performs step S302 in FIG. 10 discussed below.

in the illustrated embodiment, the controller 7 is implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller 7 can also be implemented using a plurality of separate dedicated or programmable integrated or other electronic circuits or devices (e.g., hardwired electronic or logic circuits such as discrete element circuits or programmable logic devices such as PLDs, PLAs, PALs or the like). The controller 7 can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 5, 7, 10, 11, 13 and 14 can be used as the controller. As shown, a distributed processing architecture is preferred for maximum data/signal processing capability and speed.

Figure 2:
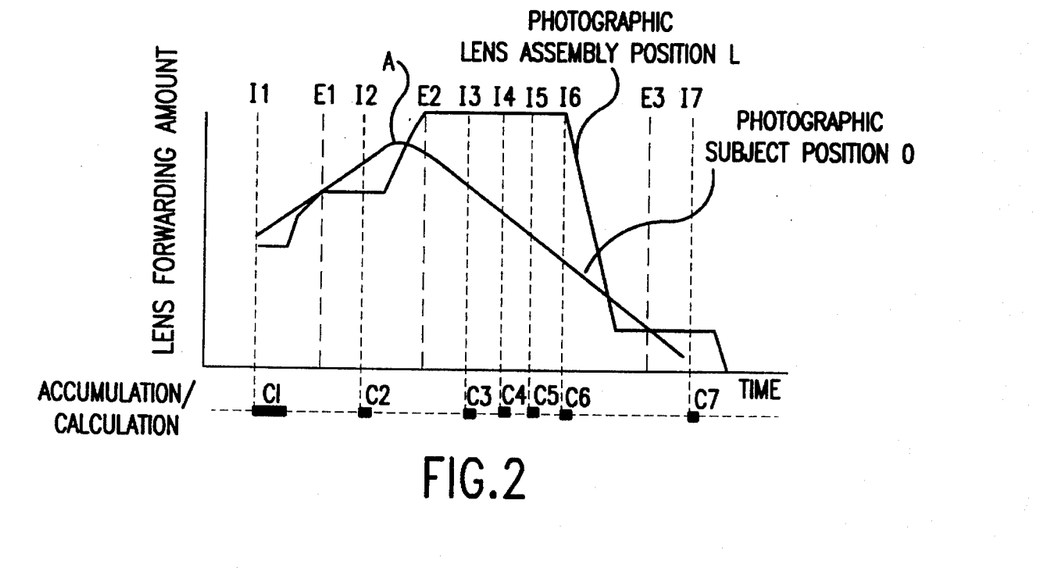
FIG. 2 depicts the relationship between lens driving and exposure driving continuous photography in the present invention.
Figure 3:
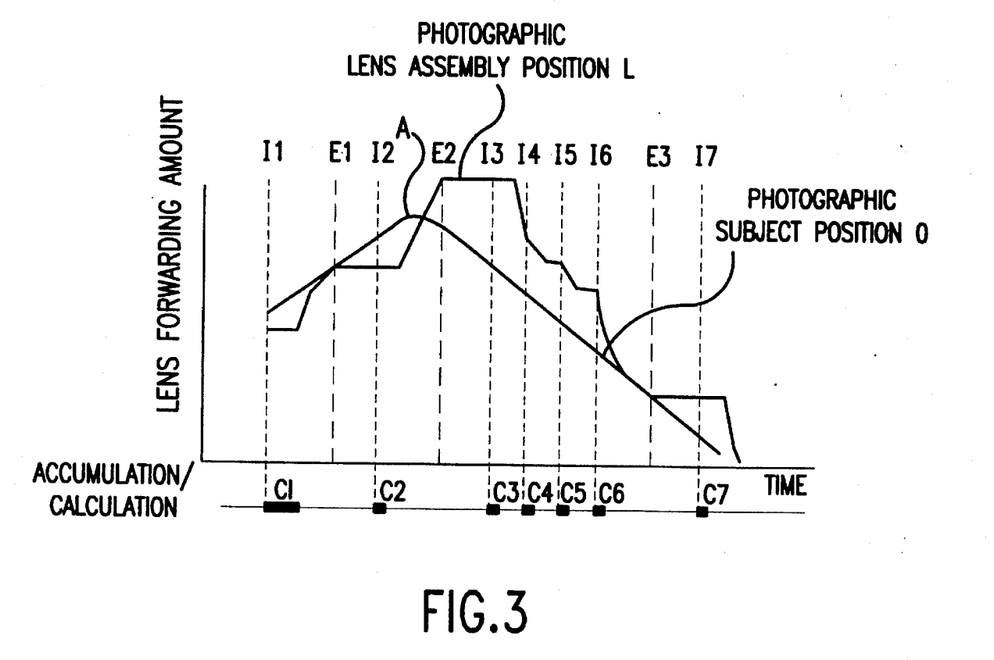
FIG. 3 depicts the relationship between lens driving and exposure in the present invention.

FIGS. 2 and 3 illustrate the locus of the movement of the photographic lens assembly 1 when the autofocus adjustment device of the present invention is operated. The dotted lines in FIGS. 2 and 3 denote the starting times of electric charge accumulation (I1, I2, . . . , I7), the broken lines denote the exposure times (E1, E2, E3), and the blocks in the accumulation/calculation line represent the period of time during which the electric charge accumulation and the focus detection calculation are performed (C1, C2, . . . , C7). Moreover, driving of the photographic lens assembly 1 is performed simultaneously with the electric charge accumulation/focus detection calculation (C1, C2, . . . , C7) of the focus detection sensor (CCD sensor), and the autofocus adjustment device is capable of performing an overlap servo operation.

As shown in FIG. 2, the movement direction of the photographic subject 2 changes between exposure times E1 and E2 during continuous photography. When the movement direction of the photographic subject changes at point A, a specified number of focus detections (C3, C4, C5, C6) and focus adjustment operations based on the results of each focus detection are performed before the next exposure time E3. As a result, the photographic lens assembly 1 approaches locus O of the movement of the photographic subject 2 as indicated by locus L of the movement of the photographic lens position. Moreover, by obtaining the results of a specified number of focus detection executions, predicted driving becomes possible, enabling movement of the photographic lens assembly 1 along locus O of the movement of the photographic subject 2.

FIG. 4 depicts the arrangement of a camera system according to an embodiment of the present invention. The camera system includes a camera body 20 and an interchangeable lens barrel 30. A portion of the light rays from a photographic subject 2 pass through a photographic lens assembly 1 and are guided to an AF module 5 through a main mirror 3 and a sub-mirror 4. The light rays are converted to electric signals denoting a focus adjustment state of the photographic lens assembly 1. The AF module 5 is a well known focus detection device consisting of a re-imaging optical system and a CCD sensor. Electric charge accumulation control is accomplished by a sensor driving circuit 6.

Upon receiving photoelectric conversion signals from the AF module 5 denoting the focus adjustment state, the controller 7 executes A/D conversion of the photoelectric conversion signals and stores them in the memory unit within the controller 7. A lens information memory circuit 8 stores lens information unique to the photographic lens assembly 1 such as, for example, the open aperture F value, or focal length, and the defocus amount/lens driving amount conversion coefficient of the photographic lens assembly 1. The lens information memory circuit 8 is connected to the controller 7 when the interchangeable lens barrel 30 is connected to the camera body 20. The controller 7 obtains the defocus amount, or the focus shift amount, from the stored photoelectric signal data denoting the focus adjustment state and computes a lens driving amount based on this defocus amount (i.e., focus coordination information) and the defocus amount/lens driving amount conversion coefficient data stored in the lens information memory circuit 8. The controller 7, the AF module 5, and the sensor driving circuit 6 then execute an electric charge accumulation operation and the focus detection determination as described below with reference to FIG. 6.

A motor control circuit 9 drives the photographic lens assembly 1 through a motor 11 and a movement mechanism 12 based on lens driving amount signals from the controller 7. The controller 7 and the motor control circuit 9 control the driving of the motor 11 by monitoring with an encoder 10 the lens movement amount or the position of the photographic lens assembly 1. As a result, the focus adjustment operation of the photographic lens assembly 1 is executed simultaneously with the electric charge accumulation operation and the focus detection operation.

An external operating member 13 of the camera body 20 includes a plurality of switches SW1–SW3. Switches SW1 and SW2 are controlled by the operation of a release button. The autofocus adjustment, etc., of the photographic lens assembly 1 is initiated by switch SW1 with a first stroke or half-depression of the release button. The exposure control sequence is initiated by switch SW2 with a second stroke or full depression of the release button. Switch SW3 is operated for continuous photography.

Figure 5:
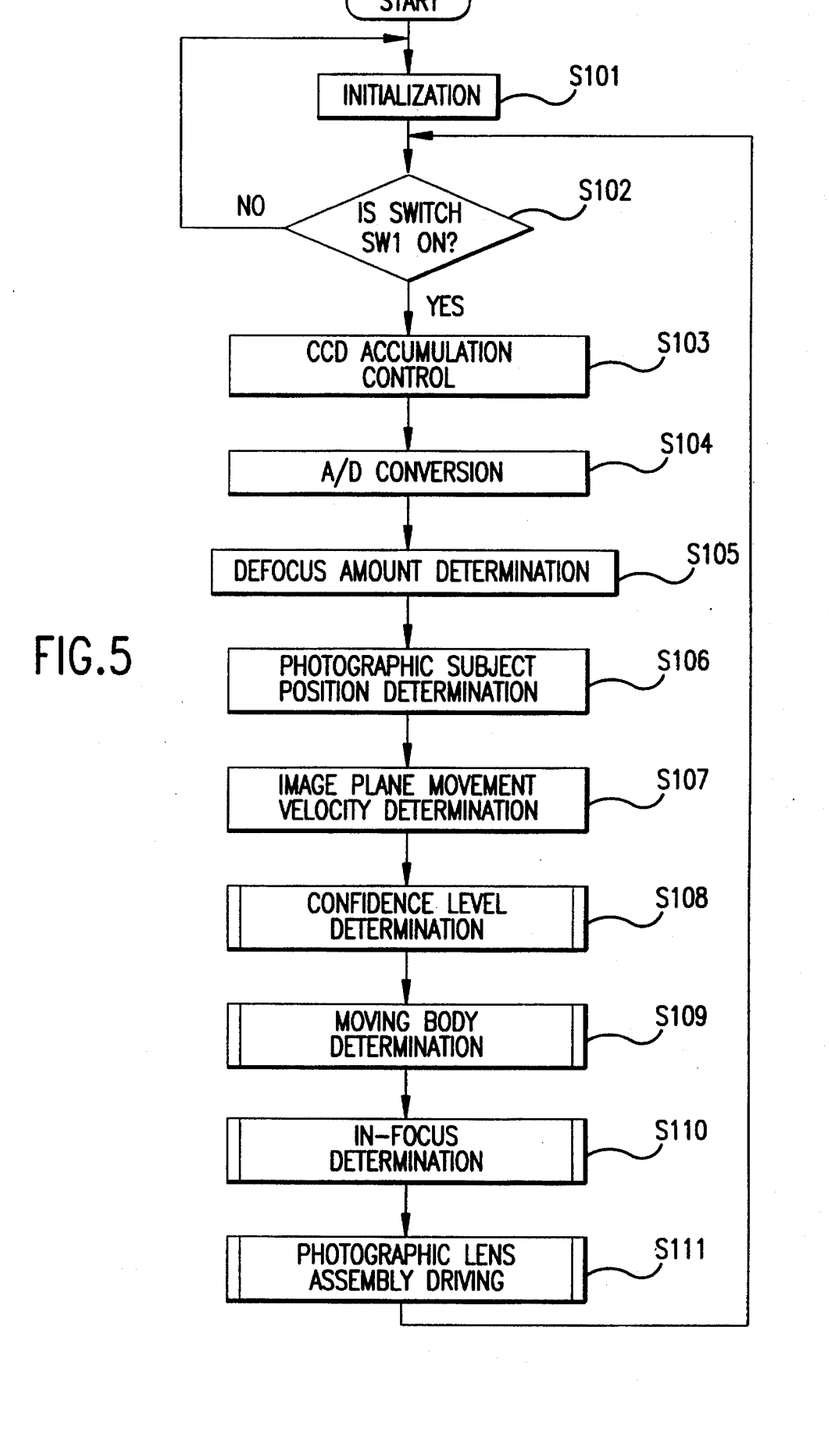
FIG. 5 is main flow chart depicting the operation of the camera.

These operations are executed by the controller 7. FIG. 5 is a main flow chart illustrating the operation of the autofocus adjustment device according to an embodiment of the present invention.

In step S101, the memories and the flags including, for example, the previously detected defocus amount, the midpoint time of the CCD sensor accumulation time of the CCD sensor in the AF module, the movement graph (which indicates that the subject is a moving body), and the focus graph (which indicates that the photographic lens assembly is in-focus) are initialized. In step S102, switch SW1 is checked. When switch SW1 is "ON" (i.e., the release button is half depressed), the operation of the controller 7 proceeds to step S103. The operation of the controller 7 returns to step S101 when switch SW1 has not been operated.

Figure 6:
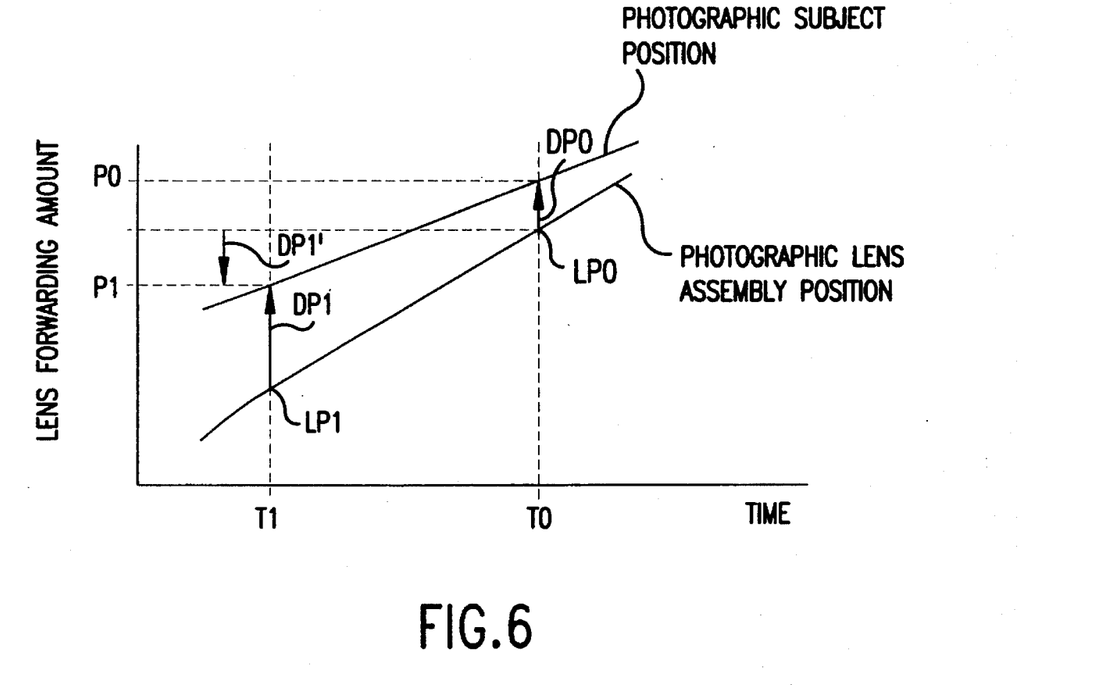
FIG. 6 describes the computation method for the image plane movement velocity.

Step S103 is a subroutine for CCD accumulation control. In the accumulation control subroutine, the starting and ending of electric charge accumulation for the CCD sensor of the AF module 5 are controlled. In addition, the average lens position LPO during accumulation is determined by controller 7 by a monitoring pulse from the encoder 10. The average lens position LPO, as shown in FIG. 6, is determined by counting the number of feedback pulses from the encoder 10 from the start to the end of electric charge accumulation.

In order to obtain lens information at the midpoint T0 of accumulation time, lens communication is started at time T1. Lens information is sent from the lens information memory circuit 8 to the controller 7 at the start of lens communication.

Step S104 is an accumulation control subroutine in which A/D conversion of the analog signals photoelectrically converted by the CCD sensor in the AF module 5 is executed. The results of the A/D conversion are stored in the memory of the controller 7. The operation of the autofocus adjustment device then proceeds to step S105.

Step S105 is a well known subroutine for defocus amount determination. Here, the defocus amount is determined or computed based on the photoelectric conversion signals stored in the memory. The operation of the controller 7 then proceeds to step S106. In step S106, a subject target position P0 is determined. The subject target position P0 represents the position of the photographic subject 2 at the accumulation mid-point time T0 as illustrated in FIG. 6. The defocus amount DF0 obtained in step S105 is converted to a lens movement amount DP0 of feedback pulse conversion according to the following relationship.

$$DP0 = KB*KL*DF0/(1-L*DF0) \quad (1)$$

At this time, the lens movement amount DP0 is determined using two defocus amount/lens driving amount conversion coefficients KL and L and the lens driving/pulse conversion coefficient KB unique to the camera body 20.

The defocus amount DF0 obtained by present detection is equivalent to the defocus amount at the average lens position during present accumulation; Hence, the subject target position P0 is determined on the basis of the following relationship.

$$P0 = DP0 + LP0 \quad (2)$$

In step S107, the image plane movement velocity S0 and the focus position change velocity SP0 are determined. In step S108, the confidence value J0 of the current detected focus amount is determined. The confidence value J0 indicates whether the current defocus amount is reliable based on past defocus amounts stored in the memory of the controller 7.

In step S109, the controller 7 determines whether the photographic subject 2 is moving based on a present defocus amount and the past focus detection information (defocus amount, average lens position, and the accumulation midpoint time) stored in the memory. In step S110, a present in-focus status is determined. In step S111, a control amount needed to actually execute photographic lens assembly driving is determined.

Hereafter, a detailed description of each subroutine will be given. As discussed above, the image plane movement velocity S0 is determined in step S107. The determination of the image plane movement velocity S0 and the focus position change velocity SP0 will be discussed with reference to FIG. 6. The image plane movement velocity computation subroutine determines the image plane movement velocity S0 produced by movement of the photographic subject 2 and the lens position change velocity or focus position change velocity SP0 at different times T1 and T0, assuming that the lens position is fixed.

The image plane movement velocity S0 is used for determining whether the photographic subject 2 is moving while the focus position change velocity SP0 is used for photographic lens assembly movement control. The defocus amount represents the relative distance of the photographic subject to the image plane observed from the predicted image plane. The change of the defocus amount with respect to movement of the photographic lens assembly is, in general, not proportional but varies with the position of the photographic lens assembly 1. As a result, simple addition and subtraction of the defocus amounts at various photographic lens assembly positions are inappropriate when the photographic subject 2 is moving. Therefore, in order to compute the image plane movement velocity S0, the first relative value DP1' of the subject position P1 at the previous accumulation mid-point time T1 observed from the present accumulation mid-point time (T0) is determined according to the relationship.

$$DP1'=P1-LP0 \quad (3)$$

where P1 denotes the previous subject target position.

The relative value DP1' is converted to the defocus amount DF1' using the defocus amount/lens driving amount conversion coefficient obtained at present current accumulation mid-point time (T0).

$$DF1'=DP1'/(KB*KL+DP1'*L) \quad (4)$$

The image plane movement velocity S0 is determined using the current defocus amount DF0, the defocus amount DF1' at the previous accumulation mid-point time observed from the present accumulation mid-point time, and the time interval between the two times.

$$S0=(DF0-DF1')/(T0-T1) \quad (5)$$

The determination of the focus position change velocity SP0 will be described with reference to FIG. 6. The focus position change velocity SP0 is obtained as the displacement value of the in-focus lens position per unit of time using the photographic lens assembly position P1 to focus on the photographic subject 2 at the previous accumulation mid-point time T1, the photographic lens assembly position P0 to focus on the photographic subject at the present accumulation mid-point time T0, and the time interval during those times.

$$SP0=(P0-P1)/(T0-T1) \quad (6)$$

In the present embodiment, the present focus detection results and the previous focus detection results are used to determine the image plane movement velocity and the focus position change velocity, but other results can be used with equal success. For example, the present results and the results from one moment before the previous focus detection can be used.

Figure 7:
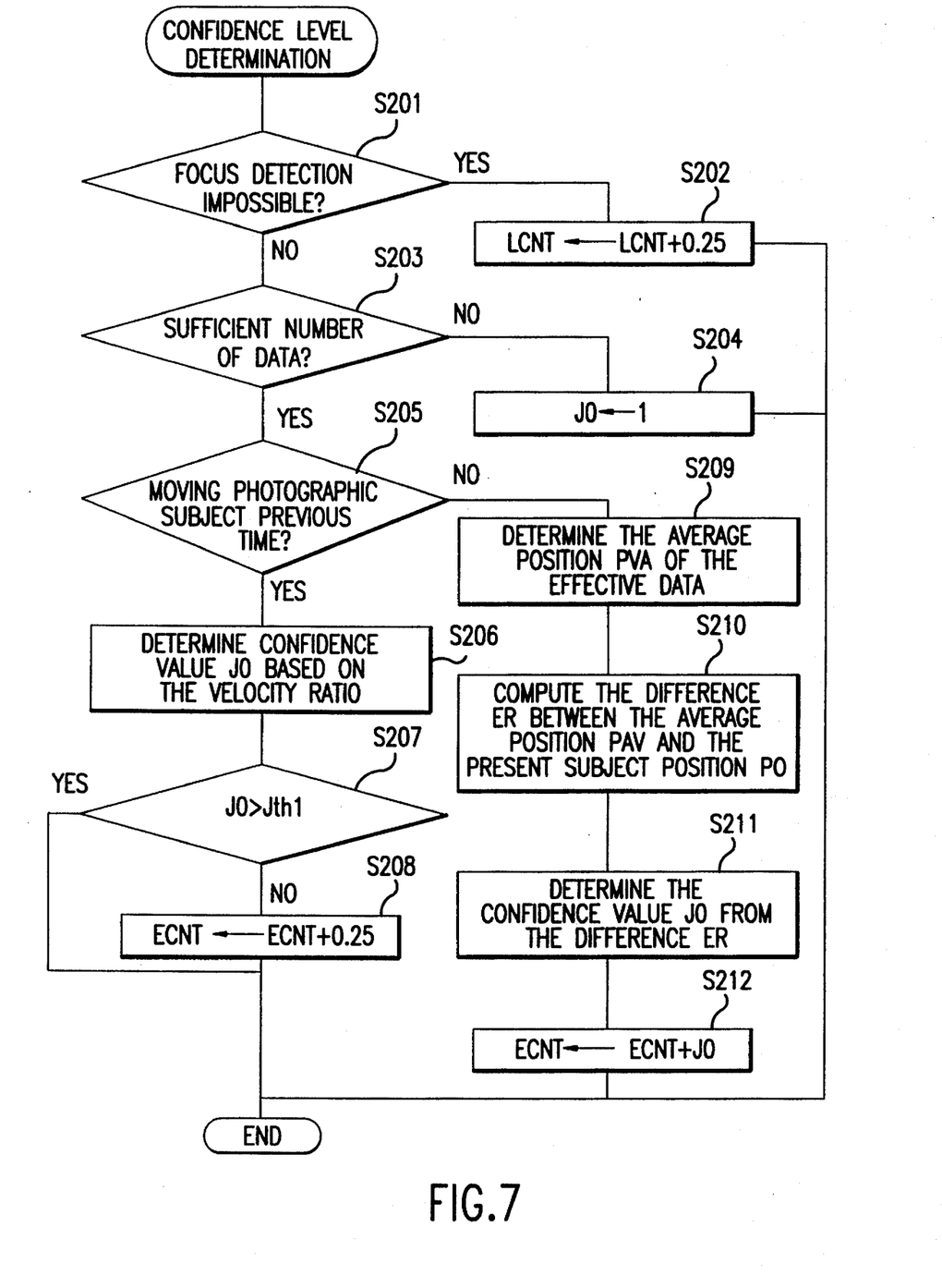
FIG. 7 is a flow chart illustrating the confidence level determination.

A subroutine for determining a confidence level is performed in step S108. FIG. 7 illustrates the subroutine performed in step S108. In step S201, a determination is made as to whether focus detection is currently possible because a confidence level cannot be computed if focus detection is impossible. If focus detection is impossible, the operation of the focus adjustment device proceeds to step S202.

In step S202, a variable LCNT, which indicates the impossibility of continuous focus detection, is increased by 0.25. The variable LCNT is used to clear stored past focus detection information when detection is determined to be impossible for four consecutive times. The subroutine is completed and the operation of the focus adjustment device proceeds to step S108.

When focus detection is not impossible, the operation of the focus detection device proceeds to step S203. In step S203, a determination is made as to whether sufficient data is available to determine the confidence level of the focus detection results. When insufficient data exists, the controller 7 is unable to compute a confidence value. The operation of the focus adjustment device proceeds where the present confidence value JO has changed to 1. The subroutine is complete and the operation of the focus adjustment device proceeds to step S109.

When sufficient data exists in step S203, the subroutine proceeds to step S205. In step S205, the controller 7 tests and determines whether the photographic subject 2 was a moving body during the previous time. If the photographic subject 2 was a moving body, the controller 7 moves to step S206 to compute the confidence value using the image plane movement velocity ratio H. The image plane velocity ratio H is the ratio between the present and previous image plane velocities.

When the photographic subject 2 was not a moving body, an accurate confidence value cannot be determined because of the occurrence of a small image plane movement velocity caused by a focus detection error in computing the confidence value based on the image plane movement velocity ratio. Therefore, in steps S209–S211, a deviation ER is computed using an average position PAV of the photographic subject 2 obtained from the lens forwarding amount based on the defocus amount obtained previously and the position P0 of the photographic subject obtained from the lens forwarding amount based on the defocus amount presently obtained. The confidence value JO is determined based on the deviation ER.

Figure 8:
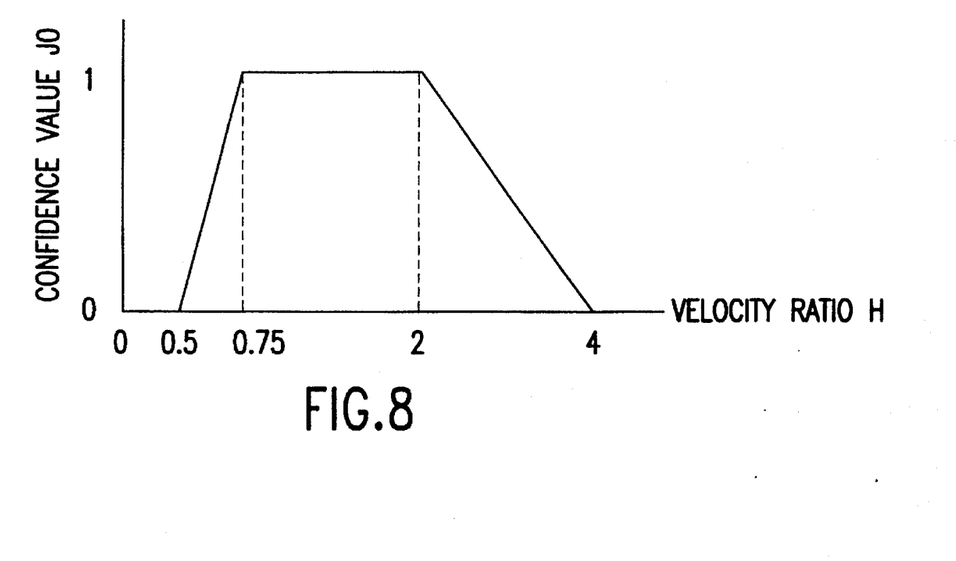
FIG. 8 depicts the relationship between the confidence value and the velocity ratio when the previous subject is a moving body.

The confidence value JO in step S205 is determined on the basis of the image plane movement velocity ratio H, as illustrated in FIG. 8. The confidence value is 1 as long as the image plane movement velocity ratio H is between 0.75 and 2. The confidence value assumes a value between 0 and 1 when the image plane movement velocity ratio H is between 0.5 and 0.75 or between 2 and 4. In intervals other than these, the confidence value is 0.

When the photographic subject detected previously and the present photographic subject are the same, the image plane movement velocity ratio becomes 1 provided that the change in acceleration is small. Moreover, even if the acceleration of the photographic subject changes substantially, if a small period of time has elapsed after the previous detection of the image plane movement velocity, the velocity ratio H is in the interval 0.75–2 centering around 1. By checking the image plane movement velocity ratio H, it becomes possible to detect such states as photographic subject jump or moving out of the focus detection area.

In step S207, the confidence value JO in step S206 is checked against a predetermined value Jth1. When the confidence value JO is greater than the predetermined value, the subroutine is completed and the autofocus adjusted device proceeds to step S109. When the confidence value JO is less than the predetermined value Jth1, the subroutine proceeds to step S208 and increases a cumulative confidence value ECNT by 0.25. The operation of the autofocus adjustment device then proceeds to step S109. The predetermined value Jth1 is defined to be a value between 0.2 and 0.5.

The cumulative confidence value ECNT may change substantially from the previous photographic subject if a situation continues in which the detected defocus amount does not have a sufficient level of confidence, for example, a situation where the photographic subject is changed intentionally by the photographer. In this situation, the ECNT is used as a determination value to clear previously stored defocus amount data. In the present embodiment, the previously stored defocus amount data is cleared when the photographic subject is a moving body, and the situation continues four consecutive times in which the confidence value JO falls below the predetermined value Jth1.

When it is determined in step S205 that the photographic subject is not a moving body, the operation of the autofocus adjustment device proceeds to step S209. In step S209, an average position PAV of the effective data (subject position data obtained from the lens forwarding amount based on the previously obtained defocus amount) is determined from the following relationship.

$$P_{AV}=(P1+P2+P3+\ldots+P6)/6 \qquad (7)$$

This equation represents an example in which the number of effective data is 6. Here, an average of the totality of effective data is computed as the average position PAV, but an average of 2 or 3 data from the latest effective data can be used equally well.

In step S210, the deviation ER of the average position PAV from the current subject target position P0 is determined. In step S211, the confidence value JO is determined based on the deviation ER as described in FIG. 9. Here, the confidence value JO depends on the deviation ER and the focal length f of the photographic lens assembly. The confidence value JO depends on the focal length because a photographic lens assembly 1 with a long focal length and a photographic lens assembly 1 with a short focal length have different changes in the subject target position, assuming that the photographic distance of the photographic lens assembly changes the same amount.

Figure 9:
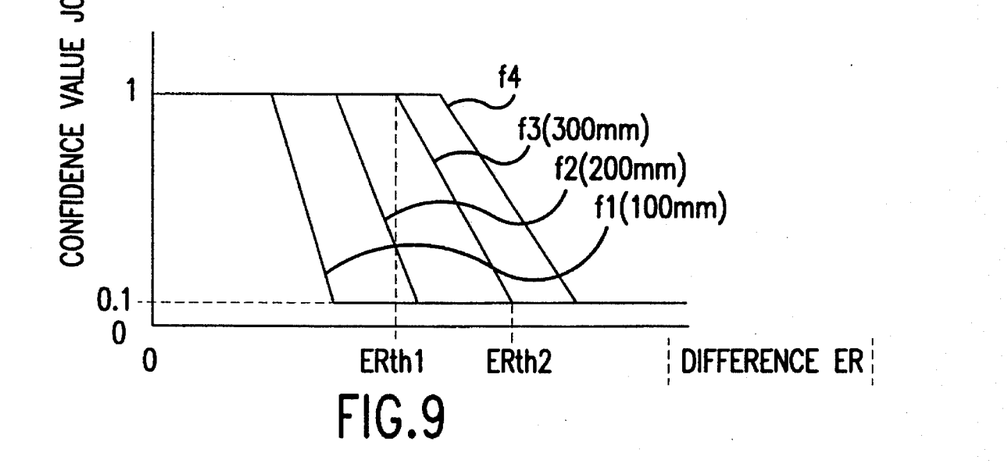
FIG. 9 depicts the deviation between the confidence value and the average position when the previous subject is a still body.

The confidence value JO is 1 when the deviation ER is between 0 and ERth1, between 0 and 1 when the deviation ER is between ERth1 and ERth2, and 0.1 when the deviation is greater than or equal to ERth1. If a condition continues in which the confidence value falls below the predetermined value Jth1, then the confidence value does not equal 0 even if the deviation ER is greater than or equal to ERth2 because the stored previous defocus amount needs to be cleared if the photographer intentionally changes the subject. The predetermined values ERth1 and ERth2 are tabulated below.

|       | f1<br>f < 150 mm | f2<br>150 ≦ f < 250 | f3<br>250 ≦ f < 350 | f4<br>350 mm < f |
|-------|------------------|---------------------|---------------------|------------------|
| ERth1 | 5 mm             | 7.5 mm              | 10 mm               | 12.5 mm          |
| ERth2 | 8 mm             | 10.5 mm             | 13 mm               | 15.5 mm          |

In step S212, the present confidence value JO is added to the cumulative confidence value ECNT. The subroutine is complete, and the operation of the autofocus adjustment device proceeds to step S109.

Figure 10:
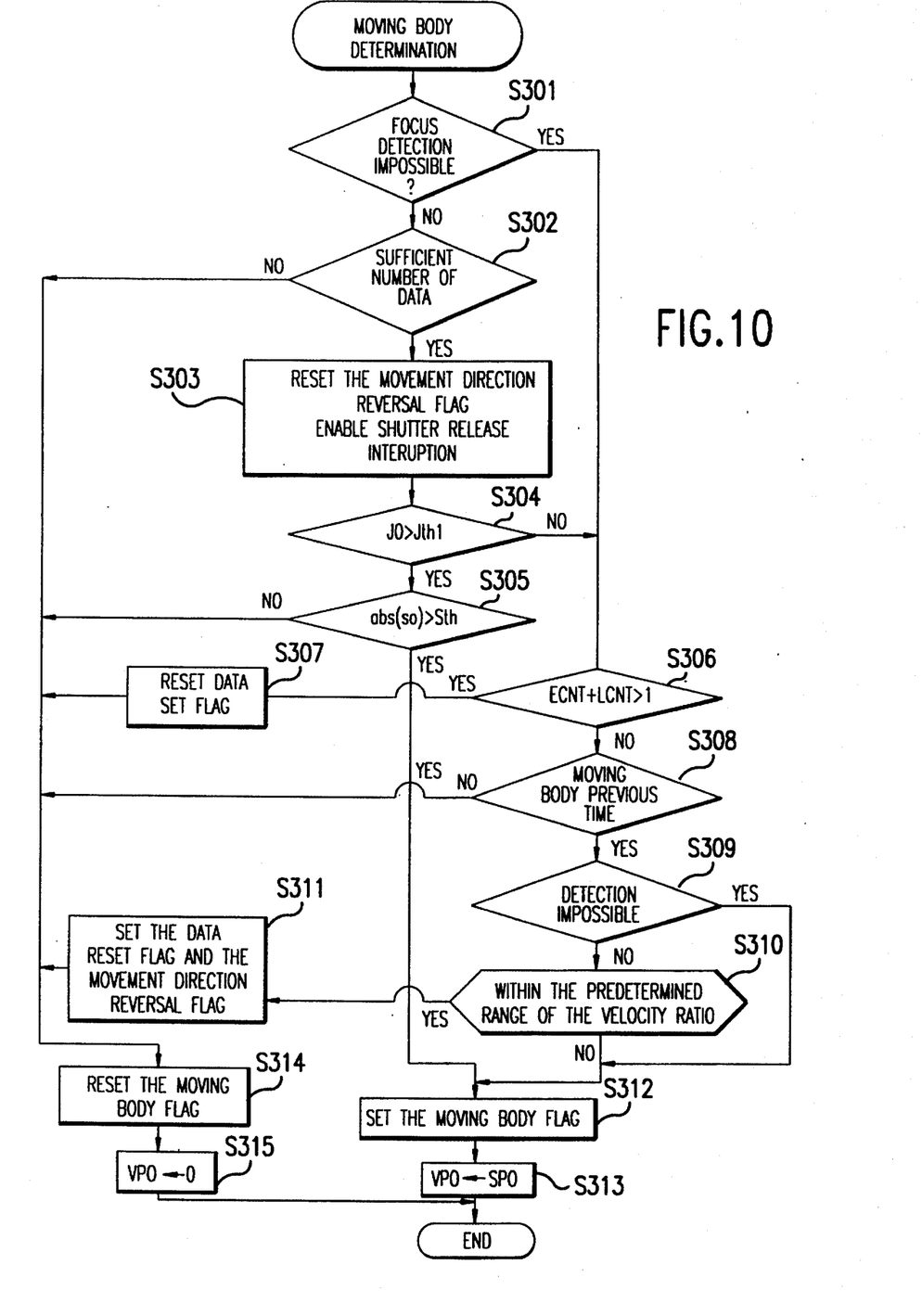
FIG. 10 is a flow chart illustrating moving body determination.

A subroutine for determining whether the photographic subject is a moving body in step S109 will be explained in connection with FIG. 10. In step S301, a determination is made as to whether present focus detection is possible. If focus detection is possible, the operation of the controller 7 proceeds to step S302.

In step S302, a determination is made as to whether the number of effective data (subject position data obtained from the lens forwarding amount based on past defocus amounts) is sufficient for determining whether the photographic subject is a moving body. If there is a sufficient number of effective data, the operation of the controller 7 proceeds to step S303. A determination is made as to whether the number of effective data is sufficient for predicted driving of the photographic lens assembly 1 when a change in movement direction is indicated by a flag. If there is a sufficient number of effective data, it is possible to make the photographic lens assembly 1 comply with the locus of movement of the moving photographic subject 2.

Figure 14:
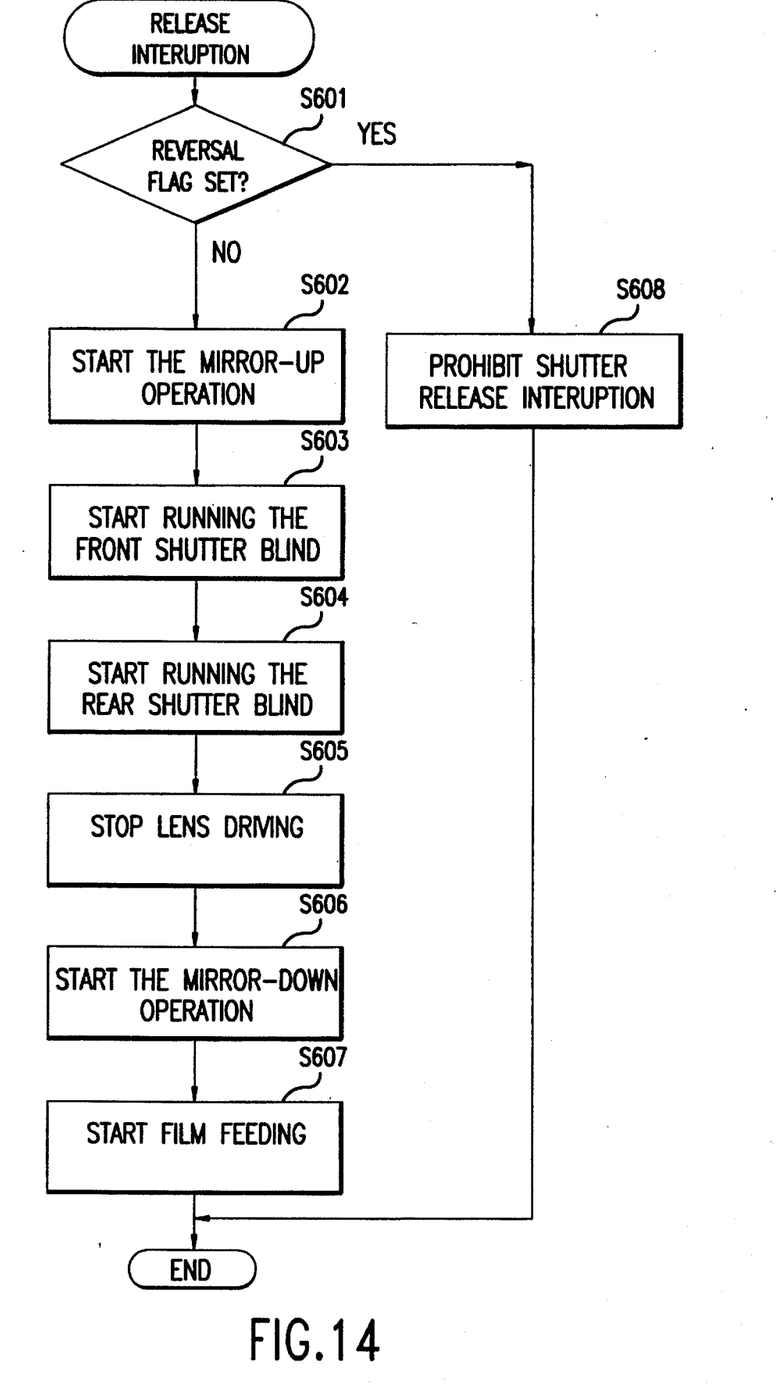
FIG. 14 is a flow chart depicting the release interruption process.

In step S303, the movement direction reversal flag indicating reversal or change of the movement direction of the photographic subject 2 is cleared or reset, and the interruption process by the shutter release, as shown in FIG. 14 is enabled.

In step S304, a determination is made as to whether the present confidence value JO is larger than the predetermined value Jth1. If it is larger, the present defocus amount has a sufficient level of confidence, and the controller 7 proceeds to step S305. If the confidence value JO is less than or equal to the predetermined value Jth1, the controller 7 proceeds to step S306 to test the continuity (i.e., whether a confidence value smaller than the predetermined value is detected continuously).

In step S305, a determination is made as to whether the image plane movement velocity S0 is larger than or equal to the predetermined value Sth. If the image plane movement velocity S0 is equal to or larger than Sth, the photographic subject 2 is considered to be moving. The operation of the controller 7 then proceeds to step S312 to set the moving body flag.

In step S306, if the confidence value JO is less than or equal to the predetermined value Jth1 (as determined in step S304), or if present focus detection is impossible (as determined in step S301), a determination is made as to whether an operating state continues in which a low confidence value is continuously obtained. If the sum of the cumulative confidence value ECNT and the cumulative detection impossibility value LCNT is 1 or greater, the controller 7 determines that an operating state is continuing in which a low confidence value is continuously obtained. The operation of the controller 7 then proceeds to step S307. In step S307, the data of the past defocus amount stored are cleared, and the data reset flag is set. The operation of the controller 7 then proceeds to step S314.

If the sum of ECNT and LCNT is less than 1 in step S306, an operating state in which the confidence value is low does not continue for a long time. Hence, the subroutine proceeds to step S308 without clearing the data of the defocus amount stored. In step S308, the controller 7 determines whether the photographic subject 2 was a moving body at the previous time. If the photographic subject was not a moving body at the previous time, the subroutine proceeds to step S314 and concludes that the present photographic subject is a still body like the previous time since the present confidence value is also low. If the photographic subject was a moving body at the previous time, the subroutine proceeds to step S309 and concludes that the present photographic subject is a moving body like the previous time.

In step S309, the controller 7 determines whether present focus detection is possible. If focus detection is impossible, the operation of the controller 7 proceeds to step S312, and the controller 7 concludes that the photographic subject is a moving body like the previous time and sets the moving body flag.

In step S309, if focus detection is possible, the confidence value may have become smaller due to a reversal or change of the movement direction of the photographic subject, and the operation of the controller 7 proceeds to step S310. In step S310, a determination is made as to whether the image plane movement velocity ratio H is within a predetermined range. If the image plane movement velocity ratio H is within the predetermined range, it can be concluded that the movement direction of photographic subject has reversed. The controller 7 proceeds to step S311 and sets the data reset flag as well as the movement direction reversal flag. Here, the predetermined range for H is given by −2<H<0.5. When the autofocus adjustment device is tracking the same photographic subject, the reversal of direction occurs when the photographic subject crosses in front of the photographer. In this case, the image plane movement velocity ratio H satisfies −2<H<0.5.

If the image plane movement velocity ratio H is smaller than −2, the possibility is high that the photographic subject has moved out of the frame defining the focus detection area rather than that the photographic subject has crossed in front of the photographer. In this case, the movement direction reversal flag is not set and the controller 7 proceeds to step S312 and treats the photographic subject as a moving body like the previous time.

In step S312, the moving body flag is set because the photographic subject is treated as a moving body at this time. The subroutine then proceeds to step S313. In step S313, the lens movement velocity is controlled by the in-focus position change velocity to track the change of the in-focus position caused by movement of the photographic subject. Therefore, the in-focus position change speed SP0 is used as the lens movement control speed VP0. The controller 7 is complete, and the operation of the autofocus adjustment device proceeds to step S110.

In step S302, when insufficient data exists, the subroutine proceeds to step S314. In step S314, the moving body flag is cleared, and the photographic subject is treated as a still body.

The subroutine then proceeds to step S315. In step S315, the lens movement control speed VP0 is set to 0 because the photographic subject is still, and there is no change in the in-focus position with time. The subroutine is complete and the operation of the autofocus adjustment device proceeds to step S110.

Figure 11:
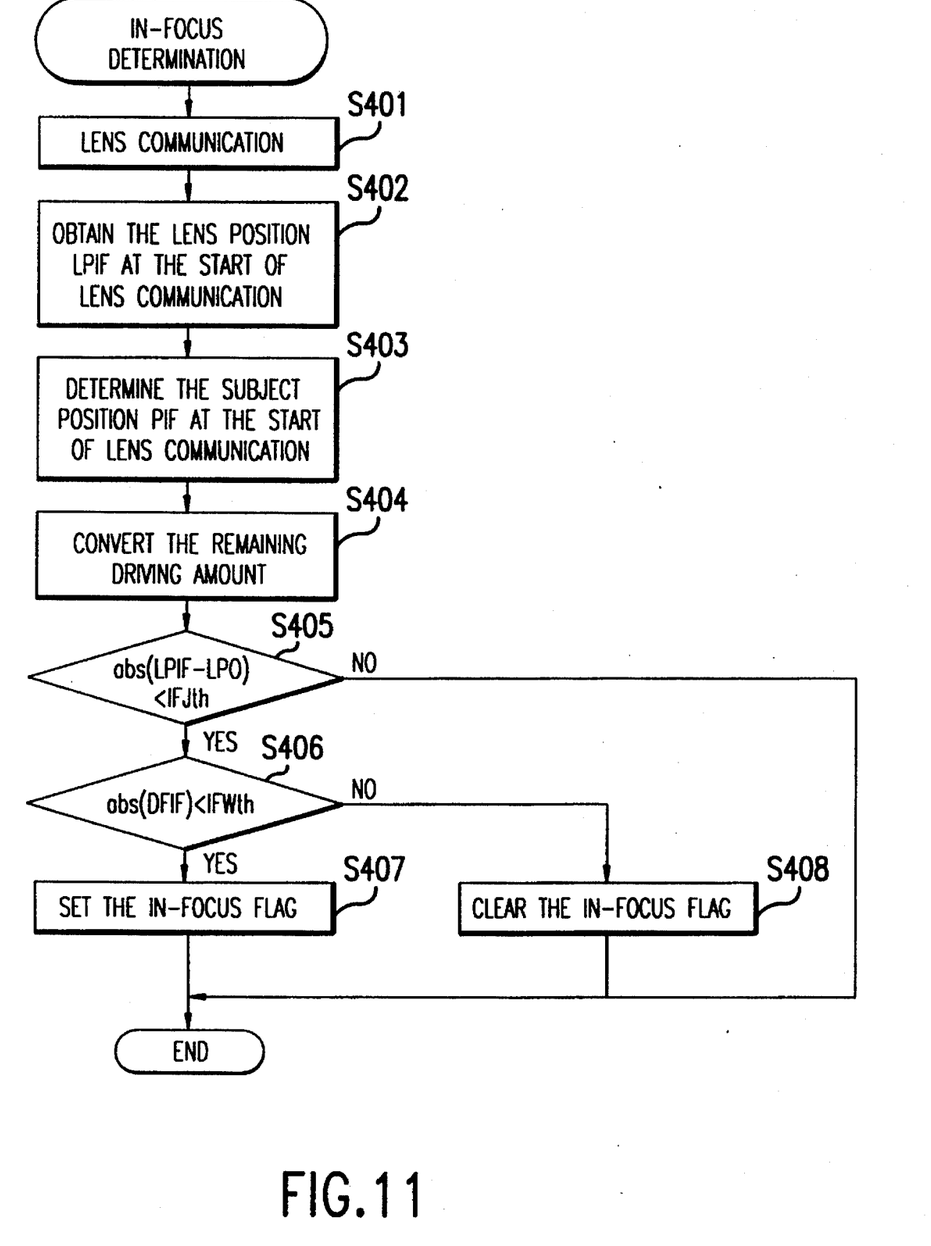
FIG. 11 is a flow chart illustrating in-focus determination.
Figure 12:
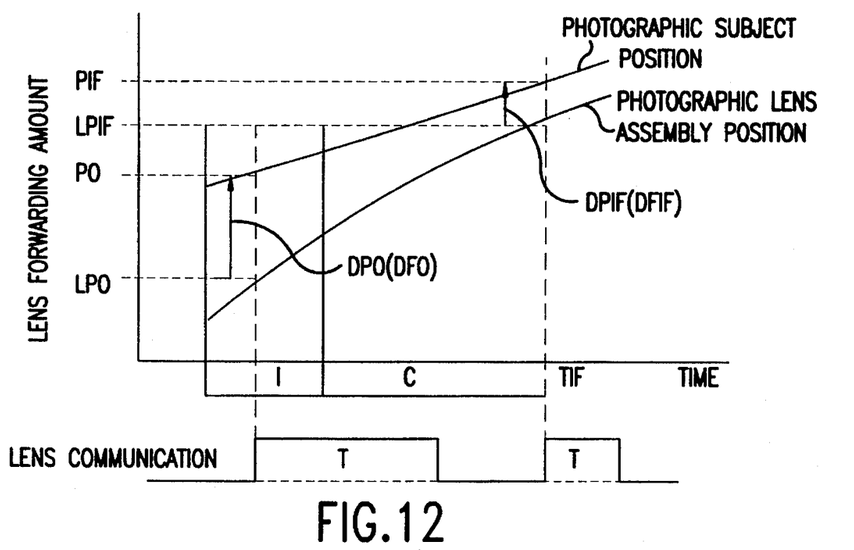
FIG. 12 depicts the in-focus determination.

A subroutine for the in-focus determination is performed in step S110 and is discussed hereafter with reference to FIG. 11. FIG. 12 illustrates the process of determining the defocus amount DFIF to be used for the in-focus determination. In FIG. 12, the symbol "T" in the line denoted by lens communication indicates the period of time during which data is exchanged between the camera body 20 and the lens body 30 by lens communication. The symbol "I" denotes the accumulation time of the CCD sensor (photoelectric conversion element), and "C" denotes the focus detection calculation time.

In step S401, the defocus amount/lens driving amount conversion coefficient to be used in the computation of the defocus amount for the in-focus determination is obtained through lens communication. The defocus amount/lens driving amount conversion coefficient changes substantially with the photographic lens assembly position.

In step S402, the lens position LPIF at the start of lens communication is obtained, and the defocus amount DFIF (defocus amount at the start of lens communication) for the in-focus determination is determined. An encoder and the like monitors the absolute position of the photographic lens assembly. The lens position LPIF can be obtained from the signals from the encoder.

In step S403, the photographic subject position PIF at the start of lens communication is determined from the following relationship.

$$PIF=VP0*(TIF-T0)+P0 \quad (8)$$

TIF denotes the starting time of lens communication. In step S404, the remaining driving amount DPIF at the time of the in-focus determination is determined by the following relationship.

$$DPIF=PIF-LPIF \quad (9)$$

The defocus amount DFIF at the time of the in-focus determination is determined based on the remaining driving amount DPIF at the start of lens communication and the defocus amount/lens driving amount conversion coefficient obtained by lens communication in step S401.

$$DFIF=DPIF/(KB*KL+DPIF*L) \quad (10)$$

In step S405, a determination is made as to whether the lens movement amount from the present accumulation midpoint time to the in-focus determination time (abs(LPIF−LPO)) is less than a predetermined value IFJth. This determination is performed to avoid execution of the present in-focus determination when the lens movement amount is larger than the predetermined value because the in-focus determination is often executed erroneously due to computation errors when the lens movement amount is large.

In step S406, a determination is made as to whether the defocus amount DFIF during the in-focus determination is within the in-focus width IFWth. The operation of the controller 7 proceeds to step S407 to reset the in-focus flag when the defocus amount DFIF is within the in-focus width IFwth. The controller 7 proceeds to step S408 to clear the in-focus flag when the defocus amount DFIF is not within the in-focus width IFwth. The subroutine is completed after the completion of step S407 or S408, and the operation of the autofocus adjustment device proceeds to step S111.

Figure 13:
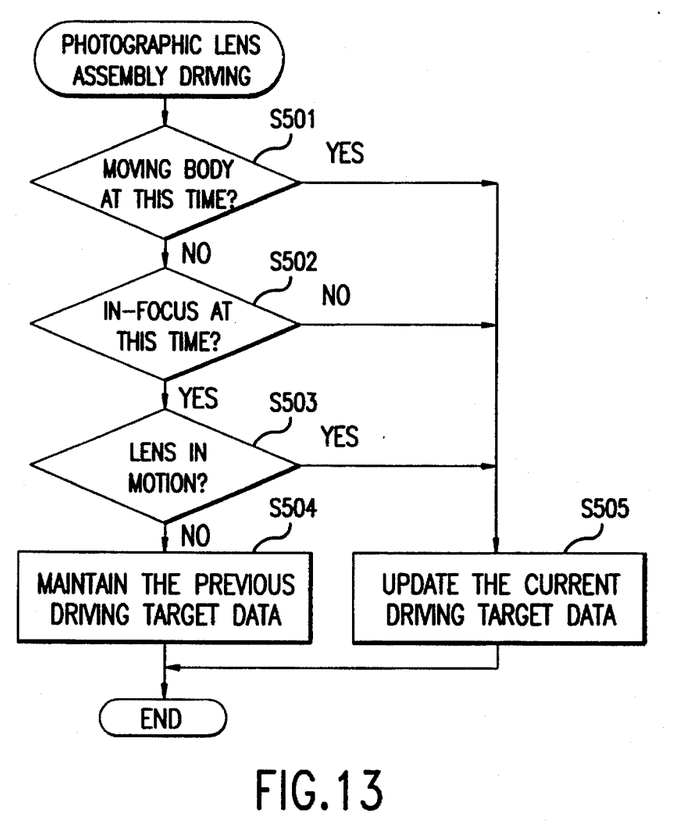
FIG. 13 is a flow chart illustrating lens driving.

A subroutine for lens driving is performed in step S111 and will be explained hereafter with reference to FIG. 13. In steps S109 and S501, whether the present photographic subject is a moving body is determined by the moving body flag. If the photographic subject, determined in step S109, is a moving body, the in-focus determination subroutine will not stop lens driving in step S110. In step S505, the data are updated to the drive target data. Here, the driving target data are the subject position P0 at the accumulation mid-point time computed at the current time and the lens movement target velocity VP0 at that time.

Step S502 is executed if the present photographic subject is determined not to be a moving body by the moving body determination subroutine in step S109. Moreover, if it is not determined by the in-focus determination subroutine at this time in step S110 that the in-focus state is obtained, the data are replaced by the driving target data computed at this time in step S505. If it is determined to be in focus, the operation of the controller 7 proceeds to step S503.

In step S503, a determination is made as to whether the photographic lens assembly is currently moving, and if so, the data are updated in step S505 by the driving target data computed at the present time. If the photographic lens assembly 1 is currently being driven, the photographic lens assembly 1 is not stopped immediately after entering the in-focus range but is driven until the photographic lens assembly 1 reaches a position where the defocus amount is 0.

If the photographic lens assembly 1 is not currently being driven, the subroutine proceeds to step S504 where the previous driving target data are maintained without updating to the previous driving target data because new photographic lens assembly driving is not executed. It is possible to drive the photographic lens assembly while tracking a moving photographic subject by updating the driving target data in step S505 to perform predicted driving. As a result, the photographic lens assembly can always be maintained in the in-focus state on a moving photographic subject as shown for example in FIGS. 2 and 3.

Next, the release interruption process that occurs when the fully-depressed switch SW2 and the continuous photographic switch SW3 of operation member 13 are turned on, that is, control of the camera during continuous photography, will be explained hereafter with reference to FIG. 14.

Release interruption is started by pushing the fully-depressed switch SW2 during normal one-frame shooting. In addition, release interruption is executed when the fully-depressed button is kept in the "ON" state during continuous photography. Release interruption is enabled once the focus detection operation is executed.

In step S601, a determination is made as to whether the movement direction reversal flag is set. Setting of the flag indicates that reversal of the movement direction of the photographic subject has just occurred and that the number of data needed to perform the moving body determination is not available. The operation of the subroutine then proceeds to step S608 where release interruption is prohibited. A shutter release lock is applied since enabling of release under such conditions may result in a blurry picture.

When the movement direction reversal flag in step S601 is not set, release interruption is executed immediately in step S602, and the mirror-up operation is started. In step S603, running of the front shutter blind is started upon completion of the mirror-up operation. In step S604, running of the rear shutter blind is started corresponding to the exposure time. In step S605, upon starting of running of the rear shutter blind, driving of the photographic lens assembly 1 is stopped.

In step S606, upon completion of running of the rear shutter blind, the mirror-down operation is started. In step S607, feeding of the film is started after a specified period of time from the starting of the mirror-down operation. The reason for delaying feeding of the film from the starting of the mirror-down operation is to prevent a large rush of current by delaying the start-up of the film feeding motor from the start-up of the film-down motor. After a specified period of time from completion of the mirror-down operation, focus detection is resumed, and the subroutine returns to the main flow chart by starting step S103 in FIG. 5. With such an arrangement, the present invention is capable of reducing the number of blurred pictures even when the movement direction of the photographic subject reverses during continuous photography.

While this invention has been described in conjunction with specific embodiments thereof, it is evident that many alternatives, modifications and variations will be apparent to those skilled in the art. Accordingly, the preferred embodiments of the invention as set forth herein are intended to be illustrative not limiting. Various changes may be made without departing from the spirit and scope of the invention as defined by the following claims.

What is claimed is:

1. An autofocus adjustment device for a camera comprising:

a focus detection assembly that repeatedly performs focus detection operations on a photographic subject and focus adjustment operations on a photographic lens assembly of the camera;

a movement direction determination assembly coupled to said focus detection assembly that determines when a movement direction of the photographic subject has changed based on results of the focus detection operations performed by said focus detection assembly;

an exposure control assembly coupled to said focus detection assembly that controls a photographic operation of the camera; and a photographic operation prohibiting control assembly that prohibits the photographic operation of the camera until a specified number of focus detection operations is executed after said movement direction determination assembly determines that the movement direction of the photographic subject has changed.

2. The autofocus adjustment device according to claim 1, wherein said focus detection assembly repeatedly performs focus detection operations by repeatedly detecting a focus coordination state of the photographic lens assembly.

3. The autofocus adjustment device according to claim 2, further comprising a memory coupled to said focus detection assembly that stores the focus coordination state of the photographic lens assembly detected by said focus detection assembly.

4. The autofocus adjustment device according to claim 3, wherein said movement direction determination assembly determines that the movement direction of the photographic subject has changed based upon the focus coordination state.

5. The autofocus adjustment device according to claim 1, wherein said movement direction determination assembly determines the movement direction of the photographic subject.

6. The autofocus adjustment device according to claim 5, wherein said movement direction determination assembly determines that the movement direction has changed when determined movement directions are different between a previous movement direction determination and a present movement direction determination.

7. The autofocus adjustment device according to claim 5, wherein said movement direction determination assembly further determines a movement amount of the photographic subject.

8. The autofocus adjustment device according to claim 7, wherein said movement direction determination assembly determines that the movement direction has not changed when a ratio of determined movement amounts is outside of a specified range.

9. The autofocus adjustment device according to claim 8, wherein said movement direction determination assembly determines that the movement direction has not changed even if the movement direction has reversed when said ratio of determined movement amounts is outside of said specified range.

10. An autofocus adjustment device for a camera comprising:

focus detection means for repeatedly performing focus detection operations on a photographic subject and focus adjustment operations on a photographic lens assembly of the camera;

movement direction determination means for determining a reversal of a movement direction of the photographic subject based on results of the focus detection operation performed by said focus detection means;

control means for controlling a photographic operation of the camera; and prohibition control means for prohibiting the photographic operation until a specified number of focus detection operations is executed by said focus detection means after said movement direction determination means determines that the movement direction of the subject has changed.

11. The autofocus adjustment device according to claim 10, wherein said focus detection means repeatedly performs focus detection operations by repeatedly detecting a focus coordination state of the photographic lens assembly.

12. The autofocus adjustment device according to claim 11, further comprising storage means for storing the focus coordination state of the photographic lens assembly detected by said focus detection means.

13. The autofocus adjustment device according to claim 12, wherein said movement direction determination means determines that the movement direction of the photographic subject has changed based upon the focus coordination state.

14. The autofocus adjustment device according to claim 10, wherein said movement direction determination means determines the movement direction of the photographic subject.

15. The autofocus adjustment device according to claim 14, wherein said movement direction determination means determines that the movement direction has changed when determined movement directions are different between a previous movement direction determination and a present movement direction determination.

16. The autofocus adjustment device according to claim 14, wherein said movement direction determination means further determines a movement amount of the photographic subject.

17. The autofocus adjustment device according to claim 16, wherein said movement direction determination means determines that the movement direction has not changed when a ratio of determined movement amounts is outside of a specified range.

18. The autofocus adjustment device according to claim 17, wherein said movement direction determination means determines that the movement direction has not changed even if the movement direction has reversed when said ratio of determined movement amounts is outside of said specified range.

19. A method of autofocus adjustment of a photographic subject using an autofocus adjustment device, said device including a focus detection assembly that repeatedly performs focus detection operations and focus adjustment operations, a movement direction determination assembly coupled to the focus detection assembly that determines when a movement direction of the photographic subject has changed, an exposure control assembly coupled to the focus detection assembly that controls a photographic operation of the camera, and a photographic operation prohibiting control assembly that prohibits the photographic operation of the camera after the movement direction of the photographic subject has changed, said method comprising the steps of:

repeatedly performing focus detection operations on the photographic subject with the focus detection assembly;

determining whether the photographic subject is moving;

determining with the movement direction determination assembly when the movement direction of the photographic subject has changed;

controlling the photographic operation of a camera on the basis of the repeatedly performed focus detection operations; and prohibiting the photographic operation of the camera until a specified number of focus detection operations is executed after the movement direction of the photographic subject has changed.

20. The method according to claim 19, wherein said step of repeatedly performing focus detection operations includes repeatedly detecting a focus coordination state of a photographic lens assembly of the camera.

21. The method according to claim 20, further comprising the step of storing the focus coordination state in a memory coupled to the focus detection assembly.

22. The method according to claim 21, wherein said step of determining when the movement direction of the photographic subject has changed includes determining when the movement direction of the photographic subject has changed based upon the focus coordination state.

23. The method according to claim 19, further comprising the step of determining the movement direction of the photographic subject with the movement direction determination assembly.

24. The method according to claim 23, wherein said step of determining when the movement direction has changed includes determining when a previously determined movement direction and a presently determined movement direction are different.

25. The method according to claim 23, further comprising the step of determining a movement amount of the photographic subject with the movement direction determination assembly.

26. The method according to claim 25, wherein said step of determining when the movement direction has changed includes determining that the movement direction has not changed when a ratio of determined movement amounts is outside of a specified range.

27. A method of autofocus adjustment of a photographic subject comprising the steps of:

repeatedly performing focus detection operations on the photographic subject;

determining whether the photographic subject is moving;

determining when a movement direction of the photographic subject has changed;

controlling photographic operation of a camera; and prohibiting the photographic operation of the camera until a specified number of focus detection operations is executed after the movement direction of the photographic subject has changed.

28. The method according to claim 27, wherein the step of controlling the photographic operation includes controlling the photographic operation on the basis of the repeatedly performed focus detection operations.

29. The method according to claim 27, wherein said step of repeatedly performing focus detection operations includes repeatedly detecting a focus coordination state of a photographic lens assembly of the camera.

30. The method according to claim 29, wherein said step of determining when the movement direction of the photographic subject has changed includes determining when the movement direction of the photographic subject has changed based upon the focus coordination state.

31. The method according to claim 27, further comprising the step of determining the movement direction of the photographic subject.

32. The method according to claim 31, wherein said step of determining when the movement direction has changed includes determining when a previously determined movement direction and a presently determined movement direction are different.

33. The method according to claim 27, further comprising the step of determining a movement amount of the photographic subject.

34. The method according to claim 33, wherein said step of determining when the movement direction has changed includes determining that the movement direction has not changed when a ratio of determined movement amounts is outside of a specified range.

* * * * *